United States Patent
Yesh et al.

(10) Patent No.: US 10,940,796 B2
(45) Date of Patent: Mar. 9, 2021

(54) INTENT COMMUNICATION FOR AUTOMATED GUIDED VEHICLES

(71) Applicant: Ford Global Technologies, LLC, Dearborn, MI (US)

(72) Inventors: Kenneth Yesh, Dearborn, MI (US); Anthony D'Amato, Canton, MI (US); Shankar Narayan Mohan, Ann Arbor, MI (US); Marty Smets, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/375,950

(22) Filed: Apr. 5, 2019

(65) Prior Publication Data
US 2020/0317118 A1   Oct. 8, 2020

(51) Int. Cl.
| | | |
|---|---|---|
| *B60Q 1/26* | (2006.01) | |
| *B60Q 1/50* | (2006.01) | |
| *G06K 9/00* | (2006.01) | |
| *G05D 1/02* | (2020.01) | |

(52) U.S. Cl.
CPC .......... *B60Q 1/50* (2013.01); *G05D 1/0297* (2013.01); *G06K 9/00369* (2013.01); *B60Q 2400/50* (2013.01)

(58) Field of Classification Search
CPC .... B60Q 1/50; B60Q 2400/50; G05D 1/0297; G06K 9/00369
USPC ...................................................... 340/468
See application file for complete search history.

(56) References Cited

U.S. PATENT DOCUMENTS

| | | | |
|---|---|---|---|
| 9,475,422 B2 | 10/2016 | Hillis et al. | |
| 9,744,672 B2 | 8/2017 | Sun et al. | |
| 10,025,886 B1* | 7/2018 | Rublee | G01B 11/254 |
| 2006/0195226 A1* | 8/2006 | Matsukawa | B25J 9/162 |
| | | | 700/245 |
| 2008/0007400 A1* | 1/2008 | Murphy | H04N 9/3129 |
| | | | 340/540 |
| 2009/0118890 A1* | 5/2009 | Lin | G05D 1/0246 |
| | | | 701/28 |
| 2011/0046780 A1* | 2/2011 | Anderson | G05D 1/0274 |
| | | | 700/248 |

(Continued)

FOREIGN PATENT DOCUMENTS

| | | |
|---|---|---|
| DE | 102014204316 | 9/2015 |
| WO | 2017146815 | 8/2017 |

OTHER PUBLICATIONS

Walker, et al., Communicating Robot Motion Intent with Augmented Reality, presented at HRI '18: 018 ACM/IEEE International Conference on Human-Robot Interaction, Mar. 5-8, 2018, Chicago, IL, pp. 316-324.

(Continued)

*Primary Examiner* — Naomi J Small
(74) *Attorney, Agent, or Firm* — Burris Law, PLLC

(57) ABSTRACT

The present disclosure is directed toward, a method that includes receiving a travel path for a robot in a facility, selecting one or more target projectors disposed along the travel path, and displaying, by the one or more target projectors, one or more visual markers along the travel path of the robot to communicate an intended movement of the robot. The one or more target projectors are selected from among a plurality of projectors disposed in the facility.

18 Claims, 6 Drawing Sheets

(56) References Cited

U.S. PATENT DOCUMENTS

| | | | | |
|---|---|---|---|---|
| 2012/0182155 A1* | 7/2012 | Sato | ............... | B25J 9/1674 |
| | | | | 340/686.6 |
| 2012/0191272 A1* | 7/2012 | Andersen | ............... | B66F 9/24 |
| | | | | 701/2 |
| 2014/0168370 A1* | 6/2014 | Heidemann | ............... | G01B 11/2513 |
| | | | | 348/46 |
| 2015/0042485 A1* | 2/2015 | Suessemilch | ............... | B25J 9/1674 |
| | | | | 340/815.4 |
| 2016/0016315 A1* | 1/2016 | Kuffner, Jr. | ............... | B25J 9/1676 |
| | | | | 700/255 |
| 2016/0055677 A1* | 2/2016 | Kuffner | ............... | B62D 57/032 |
| | | | | 345/633 |
| 2016/0375592 A1* | 12/2016 | Szatmary | ............... | B25J 9/1676 |
| | | | | 700/255 |
| 2019/0033837 A1* | 1/2019 | Zanger | ............... | B25J 9/1612 |
| 2019/0202053 A1* | 7/2019 | Tan | ............... | B25J 9/1664 |
| 2019/0286145 A1* | 9/2019 | LaFary | ............... | G05D 1/024 |
| 2020/0035090 A1* | 1/2020 | Fossier | ............... | G08G 1/166 |

OTHER PUBLICATIONS

Matsumaru, T., Mobile Robot with Preliminary-Announcement and Indication of Scheduled Route and Occupied Area Using Projector, Chapter 18 of Mobile Robots Motion Planning, New Challenges, pp. 361-380, ResearchGate, 2008.

Chadalavada, et al., That's on my Mind! Robot to Human Intention Communication through on-board Projection on Shared Floor Space, AASS Research Center, Örebro University, SE, copyright 2015, IEEE.

* cited by examiner

INTENT COMMUNICATION FOR AUTOMATED GUIDED VEHICLES

FIELD

The present disclosure relates to a method of communicating intent of a robot.

BACKGROUND

The statements in this section merely provide background information related to the present disclosure and may not constitute prior art.

Robots are operable to follow a defined path while at the same time are capable of making decisions, such as avoiding obstacles. However, to a human onlooker it is unclear what the intended path of the robot may be at any given moment, and thus, can potentially obstruct the human's path. These and other issues are addressed by the teachings of the present disclosure.

SUMMARY

This section provides a general summary of the disclosure and is not a comprehensive disclosure of its full scope or all of its features.

In one form, the present disclosure is directed toward a method that includes: receiving a travel path for a robot in a facility: selecting one or more target projectors disposed along the travel path; and displaying, by the one or more target projectors, one or more visual markers along the travel path of the robot to communicate an intended movement of the robot. The one or more target projectors are selected from among a plurality of projectors disposed in the facility.

In another form, the visual markers are displayed within a defined distance from the robot as the robot moves along the travel path. The defined distance includes a set distance or a variable distance that is based on speed, set time of travel, the travel path, or a combination thereof.

In yet another form, the method further includes: acquiring data from an object detector disposed in the facility; and determining whether a human is present in proximity of the robot based on the data. The one or more visual markers are displayed along the travel path in response to the human being present, and no visual markers are displayed in response to no human being present.

In one form, the method further includes: acquiring data from an object detector disposed in the facility; determining whether an object is present along the travel path of the robot based on the images; and notifying the robot of the object in response to the object being present along the travel path. In one variation, the method further includes receiving a revised travel path to avoid the object. The one or more target projectors are selected based on the revised travel path.

In another form, the method further includes: detecting, by the robot, a human in proximity of the robot; and issuing, by the robot, an alert in response to detecting the human. The alert is a visual notification, an audible notification, or a combination thereof to notify the human of the robot.

In yet another form, the method further includes: receiving, by the robot, a work command including a destination for the robot from a fleet manager; defining, by the robot, the travel path to the destination based on a current location of the robot; and transmitting, by the robot, the travel path to a facility notification system that selects the target projectors and displays the visual marker via the target projectors.

In one form, the travel path is provided by a fleet manager system and the target projectors are selected and controlled by a facility notification system.

In another form, the method further includes: receiving, from the fleet manager system, an area notification request to have a visual notification projected on a selected area of the facility; selecting, by the facility notification system, a second target projector provided in the selected area; and displaying, by the second target projector, the visual notification in the selected area. The area notification request includes information identifying the selected area within the facility and the type of notification to be projected. The second target projector is selected from among the plurality of projectors and is not displaying the visual marker for the robot.

In yet another form, the method further includes: receiving a travel path for a manual operated vehicle in the facility; selecting one or more auxiliary target projectors disposed along the travel path of the manual operated vehicle; and displaying, by the auxiliary projectors, one or more auxiliary visual markers for the travel path of the manual operated vehicle. The auxiliary target projectors are selected from among the plurality of projectors disposed in the facility and are different from the target projectors displaying the visual markers for the robot.

In one form, the present disclosure is directed toward a method that includes: receiving, by a facility notification system from a fleet manager system, a path notification request including information indicative of a travel path of the robot for a robot in a facility; selecting, by the facility notification system, one or more target projectors provided along the travel path; and displaying, by the one or more target projectors, one or more visual markers along the travel path of the robot to communicate an intended movement of the robot. The one or more target projectors are selected from among a plurality of projectors attached at one or more locations of the facility In another form, the method further includes: acquiring, by the facility notification system, data from an object detector disposed in the facility; and determining whether a human is present in proximity of the robot. The one or more visual markers are displayed along the travel path in response to the human being present.

In yet another form, the method further includes: notifying, by the fleet manager system, the robot of the human in response to the human being present; and issuing, by the robot, an alert to notify the human of the robot. The alert is a visual notification, an audible notification, or a combination thereof.

In one form, the object detector includes a camera, a thermal imaging sensor, a laser, a light detection and ranging (LIDAR) device, and/or a combination thereof.

In another form, the method further includes determining, by the fleet manager system, the travel path of the robot based on a current location of the robot and a destination of the robot; and transmitting, by the fleet manager system, the travel path and a work command to the robot and the path notification request to the facility notification system.

In yet another form, the method further includes continuously acquiring a location of the robot to continuously display the visual markers until the robot completes travel along the travel path.

In one form, the method further includes: receiving, from the fleet management system, a travel path for a manual operated vehicle in the facility; selecting, by the facility notification system, one or more auxiliary target projectors disposed along the travel path of the manual operated vehicle, where the auxiliary target projectors are selected from among the plurality of projectors disposed in the facility and is not displaying the visual markers for the robot; and displaying, by the auxiliary projectors, one or more auxiliary visual markers for the travel path of the manual operated vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
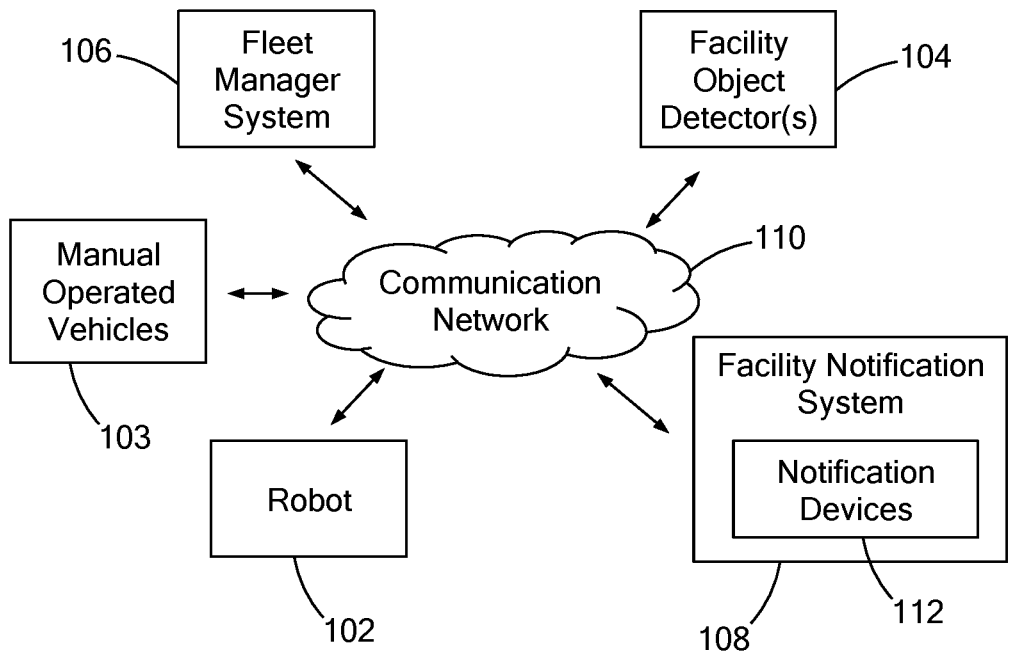
FIG. 1 is a block diagram of a system having a fleet manager system and a facility communication system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A facility having robots, such as automated guided vehicles (AGV), includes a facility notification system of the present disclosure for conveying messages or alerts regarding the movement of the robots, restricted areas within the facility, and/or other notifications. Referring to FIG. 1, in one form, a system 100 includes a robot 102 operable to move about the facility, a manual operated vehicle 103, one or more object detectors 104 disposed in the facility (i.e., "facility object detectors 104"), a fleet manager system 106, and a facility notification system 108. The robot 102, the manual operated vehicle 103, the facility object detector 104, the fleet manager system 106, and the facility notification system 108 are communicably coupled via a communication network 110. The communication network 110 includes wired communication, wireless communication (e.g., BLUETOOTH, ZIGBEE, WI-FI, etc), or a combination thereof.

As described in detail herein, the fleet manager system 106 manages the operation of the robots 102 and the manual operated vehicles 103, which may collectively be referenced to as "vehicles 102 and 103." In one form, the fleet manager system 106 is configured to: assign the robot 102 tasks, map a travel path for the robot 102 based on the task and information from the facility object detectors 104; track the location of the robot 102 and the manual operated vehicle 103; and monitor areas of the facility for potential high traffic area, restricted areas, etcs. The fleet manager system 106 further requests the facility notification system 108 to output a notification for informing humans of various activities occurring in the facility, such as: movement of the vehicles 102 and 103; a restricted area; oncoming vehicles; and/or other activities. Based on the notification request from the facility manager system 106, the facility notification system 108 selects one or more target devices from among a plurality of notification devices 112, to display visual markers along the travel path of the robot, and/or provide a visual and/or audible notification at a selected area. The notification devices 112 are disposed in the facility, and include projectors, speakers, liquid crystal displays, or a combination thereof.

In one form, the facility object detectors 104 are disposed throughout the facility to detect various elements within the facility, such as: the movement and/or location of the vehicles 102 and 103; location of humans; placement of material; and/or location of non-moveable components like equipment or manufacturing cells. The object detectors 104 include, but are not limited to: cameras, thermal imaging sensors, lasers (detecting distance and/or presence of object), and/or light detection and ranging (LIDAR) device. In one form, data from the object detectors 104 is provided to the fleet manager system 106 and the facility notification system 108.

Figure 2:
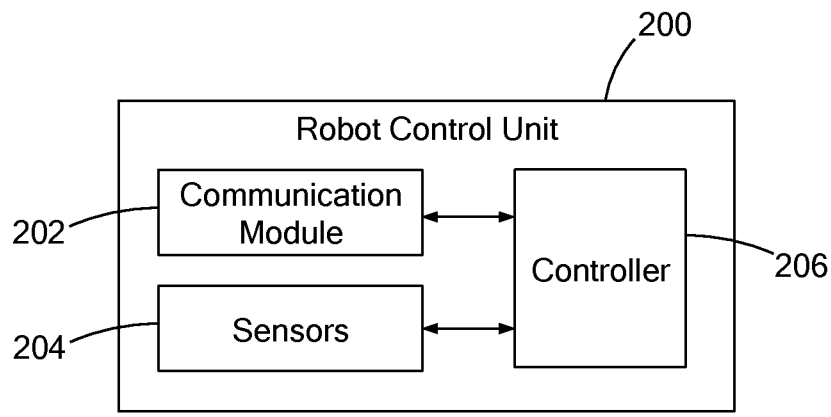
FIG. 2 is a block diagram of a robot in accordance with the teachings of the present disclosure.

The robots 102 are automated to move within the facility based on a command from the fleet manager system 106. Referring to FIG. 2, in one form, the robot 102 includes a robot control unit 200 that includes a communication module 202, one or more sensors 204, and a controller 206. The communication module 202 includes hardware components, such as a wireless transceiver, an input/output interface, and a notification device disposed on the robot 102 (e.g., a liquid crystal display and/or speaker).

The sensors 204 are disposed about the robot 102 and include object detectors to detect objects about the robot 102, devices for real time locating system (RTLS) to determine the location of the robot 102, and/or other suitable sensors. The object detectors include, but are not limited to a radar, a camera, an ultrasonic sensor, a laser, light detection and ranging (LIDAR), and/or a combination thereof. Data from the object detectors is used to monitor the environment around the robot 102 and more particularly, to detect objects, measure distance of the robot 102 from an object, determine direction of the robot, and/or combination thereof. Data from the sensors 204 is provided to the controller 206 and may be provided to the fleet manager system 106 for further processing.

In one form, the robot controller 206 receives a work command from the fleet manager system 106 via the communication module 202. The work command includes a destination for the robot 102, a task to be performed by the robot 102, and/or a travel path. The robot controller 206 is configured to execute software programs for performing the task, and move to the destination based on the travel path. As the robot 102 moves, the controller 206 processes the data from the sensors to detect objects, such as other robots 102, humans, manual operated vehicles 103, and/or barriers along the travel path or in proximity to the robot 102. In one form, if a human is detected, the controller 206 may issue an alert notifying the human of the robot 102 via the notification device of the communication module 202. For example, the alert may be a message displayed on the LCD and/or sound from the speaker. Accordingly, the robot 102 may notify the human, including a driver operating a manual operated vehicle 103, of its presence and/or intent. It should be readily understood that the robot 102 may include other components/devices, and should not be limited to the components described herein.

Figure 3:
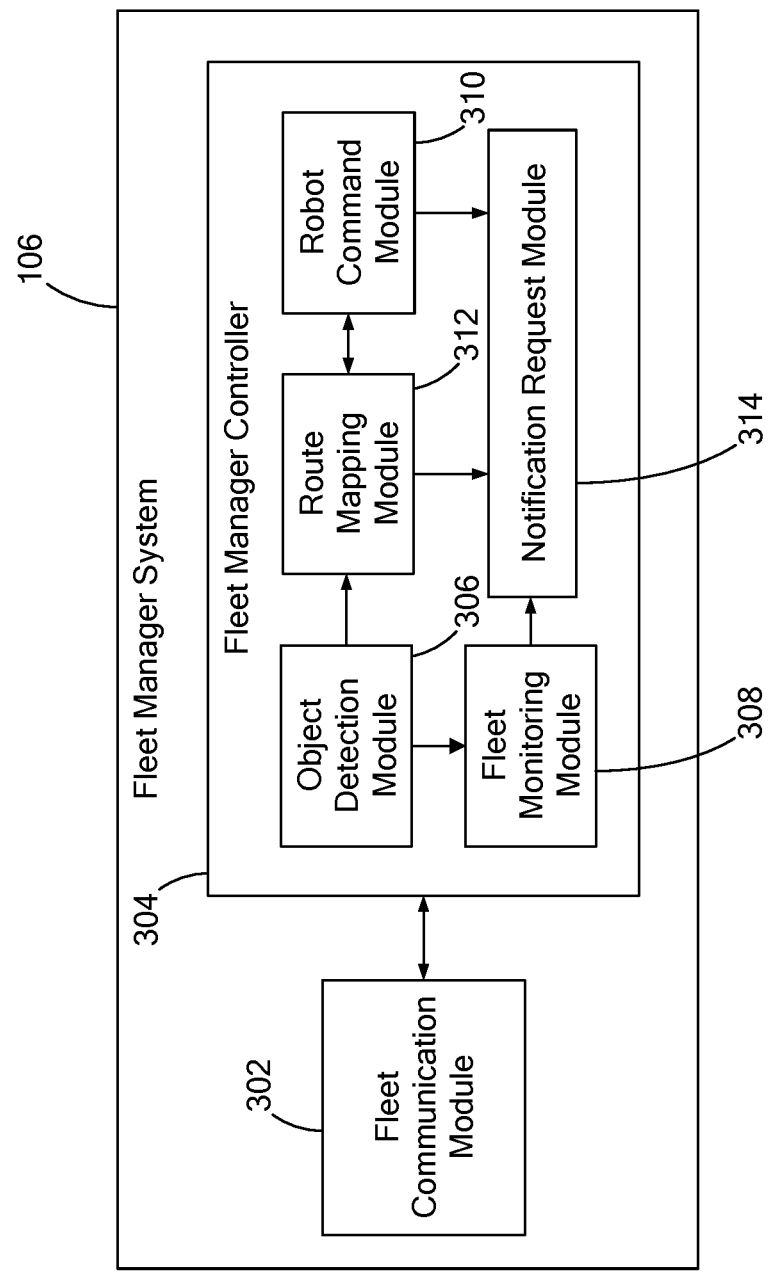
FIG. 3 is a block diagram of the fleet manager system in accordance with the teachings of the present disclosure.

Referring to FIG. 3, in one form, the fleet manager system 106 includes a fleet communication module 302 and a fleet manager controller 304. The fleet communication module 302 includes components, such as wireless transceiver, and an input/output interface to exchange data with the other components of the system 100. In one form, the fleet communication module 302 is also configured to communicate with a computing device (not shown) operable by a user. More particularly, the user, via the computing device and communication module 302, exchange data with the fleet manager controller 302 to perform various operations, such as managing tasks for the robots 102, viewing operation of the vehicles 102 and 103, and/or identifying restricted areas of the facility.

In one form, the fleet manger controller 304 is configured to include an object detection module 306, a fleet monitoring module 308, a robot command module 310, a route mapping module 312, and a notification request module 314. The object detection module 306 is configured to detect objects within the facility based on data from the facility object detectors 104. For example, the object detection module 306 may identify humans in the facility based on the thermal images or object recognition software. In another example, humans, equipment, and/or vehicles may have a fiducial marker, such as an APRIL tag, disposed thereon that is visible by the object detectors 104. Accordingly, the object detection module 306 recognizes the marker and obtains information associated with the marker from a database (not shown), such as an identification information of the object (e.g., name, serial number).

Based on the information received and the information from the object detection module 306, the fleet monitoring module 308 tracks the position and activity of the vehicles 102 and 103. In one form, the fleet monitoring module 308 identifies obstacles that may interfere with the travel of the vehicles 102 and 103, defines restricted areas based on information from the user, generates maps of the facility illustrating position of equipment, the vehicles 102 and 103, and identified objects.

In one form, the robot command module 310 generates the work command and transmits it to the robots 102 with the travel path defined by the route mapping module 312. The work command defines the task to be performed, the destination for the robot 102, and/or the travel path. In one form, the tasks to be assigned include requested tasks and routine tasks. For example, the robot command module 312 receives a task request from the user via the communication module 302, and generates the work command based on the task requested. In another form, the robot command module 312 is configured to assign one or more tasks that are routinely performed by the robots based on a defined schedule (e.g., tasks that are scheduled daily, weekly, and/or monthly).

The robot mapping module 312 is configured to determine the travel path of the robot 102 based on a current location of the robot 102, a destination of the robot 102, and/or information from the object detection module 306. In one form, the robot mapping module 312 is configured to revise the travel path based on new information from the object detection module 306 that identifies an object along the travel path, and transmit the revised travel path to the robot 102 and the facility notification system 108.

The notification request module 314 transmits a notification request, such as a path notification request and/or an area notification request, to the facility notification system 108. The path notification request instructs the facility notification system 108 to display visual markers along the travel path of the robot 102 to communicate an intended movement of the robot 102. In one form, the path notification request includes information indicative of the travel path of the robot 102, identification information of the robot 102, and/or a condition on when to display the visual indicator (e.g., only when a human is in the vicinity). The area notification request instructs the facility notification system 108 to display a visual notification projected on a selected area of the facility. The area notification request includes information identifying the selected area within the facility and the type of notification to be projected (e.g., "do not enter", "restricted area", "operation in progress", etc).

Figure 4:
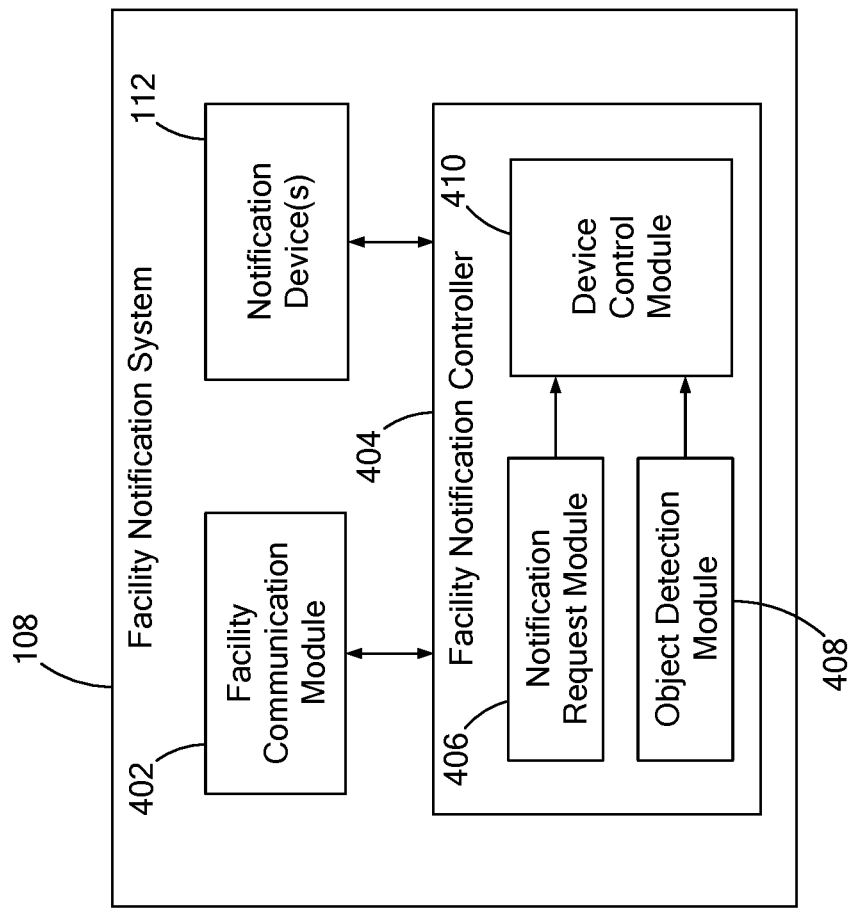
FIG. 4 is a block diagram of the facility communication system in accordance with the teachings of the present disclosure.

Referring to FIG. 4, in one form, the facility notification system 108 is configured to include the notification devices 112, a facility communication module 402, and a facility notification controller 404. In one form, the facility communication module 402 and the notification controller 404 are disposed together, and the controller 404 is in communication with the notification devices 112 via the communication module 402. The facility communication module 402 includes components, such as wireless transceiver, and an input/output interface to exchange data with the other components of the system 100 and with external computing devices.

In one form, the notification controller 404 is configured to include a notification request module 406, an object detection module 408, and a device control module 410. The notification request module 406 receives the notification request from the fleet manager system 106, and based on the information provided in the notification, determines the request type (i.e., path or area) and details regarding the notification, such as travel path, selected area, etc.

In one form, the object detection module 408 is similar to the detection module 306, and is configured to detect objects that may be present within portions of the facility that receive a notification. For example, the object detection module 408 determines whether objects are present within the travel path of the robot 102 as the robot 102 moves along the path. If an object is present, the object detection module 408 notifies the fleet manager system 106, and may receive a revised travel path. Alternatively, the facility notification controller 404 may not include the object detection module 408, and instead receives updates from the fleet manager system 106.

In one form, the device control module 410 is configured to select one or more notification devices for performing the notification. More particularly, for a path notification, the device control module 410 selects one or more target projectors disposed along the travel path and controls the projectors to display one or more visual markers along the travel path of the robot 102 to communicate an intended movement of the robot 102. The target projectors are selected from among a plurality of projectors disposed in the facility, and are selected based on the location of the projector relative to the robot 102 and the projection range of the projector. Specifically, in one form, the target projector is provided in proximity of the robot 102 and has a projection range that overlaps with the travel path of the robot 102. For an area notification, the device control module 410 selects a target projector that is in the vicinity of the selected area and has a projection range overlapping with the selected area. Other criteria may be used for selecting the target projector while remaining within the scope of the present disclosure.

For the path notification, the visual markers may include, but are not limited to, arrows, dots, words (e.g., "intended path"), or a combination thereof. In one form, the visual markers are displayed within a defined distance from the robot 102 as the robot moves along the travel path. The defined distance may be a set distance (e.g., one meter from the robot) or a variable distance based on speed, set time of travel, the travel path, or a combination thereof. For example, the defined distance may include a distance that is within 30 seconds of travel of the robot 102. In one form, the device control module 410 continuously acquires a location of the robot 102 to display the visual markers in front of the robot 102 as the robot 102 moves and completes travel. Alternatively, if a condition for displaying the visual markers is defined in the path notification, the device control module 410 displays the visual markers based on the condition. For example, in accordance with the condition described above with respect to the notification request module 314, the device control module displays the visual markers when a human is present in proximity of the robot 102, such as within a detectable range of an object detector disposed on the robot and/or within set distance from the robot.

In the event both an area notification and a path notification request are received, the device control module 410 selects different target projectors for displaying the notifications. That is, the device control module 410 selects one or more second target projectors provided in the selected area defined by the area notification request. The second target projectors are selected from among the plurality of projectors that are not displaying the visual marker for the robot 102.

Figure 5:
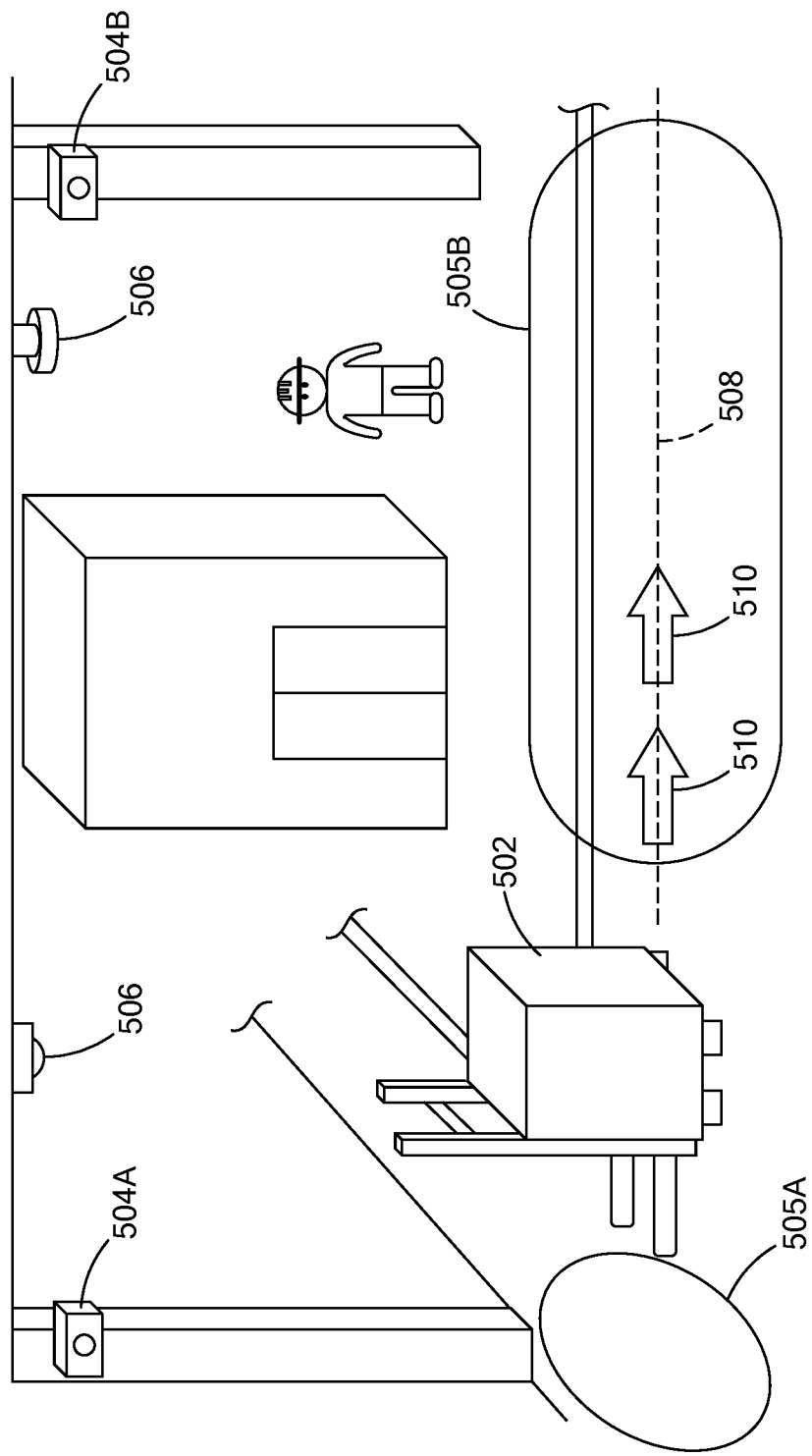
FIG. 5 illustrates a facility having a robot and projectors to display visual markers in accordance with the teachings of the present disclosure.

In one example application, FIG. 5 illustrates a section of a facility 500 having an AGV 502, multiple projectors 504A and 504B (collectively projectors 504)), and multiple object detectors 506. The projector 504A has a projection range 505A and the projector 504B has a projection range 505B. The AGV 502 moves along a travel path 508. Here, the projector 504B is in vicinity of the AGV 502 and has a projection range 505B that overlaps with the travel path 508. While projector 504A is also in proximity of the AGV 502, the projection range 505A does not overlap with the travel path 508, and thus, projector 504B is selected as the target projector to display visual markers 510.

In one variation, in lieu of receiving the travel path from the fleet manager system 106, the robot controller 206 may also be configured to define the travel path based on the work command, which includes the destination of the robot 102. For example, in one form, the controller 206 includes map data of the facility and defines the travel path based on the current location of the robot 102 and the destination. Once defined, the controller 206 may request information regarding potential object(s) along the travel path from the fleet manager system 106, and updates the travel path based on the objects identified by the fleet manager system 106. The robot controller 206 then transmits the travel path to the fleet manager system 106 and/or the facility notification system 108.

In another variation, in addition to providing visual markers for the robots 102, the fleet manager system 106 and the facility notification system 108 are configured to provide visual markers for manual operated vehicles 103. More particularly, to control travel of vehicles 102 and 103 within the facility, the fleet manager system 106 generates a driver vehicle notification that includes a travel path for the manual operated vehicle 103 and the facility notification system 108 displays visual markers based on the travel path.

In one form, the fleet manager system 106 assigns a task to a manual operated vehicle 103, generates a travel path in a similar as described above for a robot, and transmits a work command to the manual operated vehicle 103. The work command for the manual operated vehicle includes similar information as the work command for the robot (i.e., task, destination, and a travel path). The driver of the work command may receive the task via a computing device attached to the manual operated vehicle. In one form, the travel path is displayed on the computing device for the driver and can provide audible instructions as well. The manual operated vehicle 103 may also include a position sensor (e.g. a GPS) that transmits its location to the fleet manager system 106. The fleet manager system 106 transmits the driver vehicle notification to the facility notification system 108, which processes the requests in a similar manner as the path notification request for the robot 102 to display visual markers using target projectors that are not currently displaying visual markers for the robot 102 (i.e., auxiliary target projectors). In one form, the visual markers for the manual operated vehicle 103 (i.e., auxiliary visual markers) are configured to be seen by other humans and/or the driver.

Figure 6:
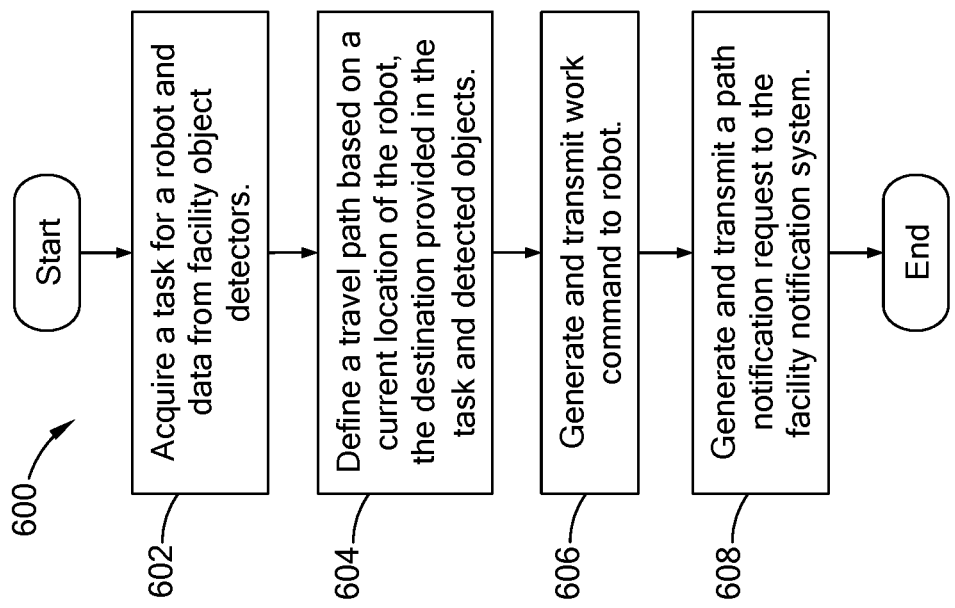
FIG. 6 is a flowchart of a robot path request routine in accordance with the teachings of the present disclosure.

Referring to FIG. 6, a flowchart of a robot path request routine 600 performed by the fleet manager system is presented. At 602, the fleet manager system acquires a task for a robot and data from the facility object detectors. The task can be a requested or a routine task. At 604, the fleet manager system defines a travel path for the robot, based on the destination provided in the task, a current location of the robot, and detected objects. That is, in one form, the manager system defines an optimal path for the robot based on the current location of the robot and the destination. The manager system analyzes the data from the object detectors to determine whether there are obstacles along the optimal path. If so, the optimal path is revised. The final path is provided as the travel path. At 606, the manager system generates and transmits a work command to the robot, and at 608 generates and transmits a path notification request to the facility notification system.

Figure 7:
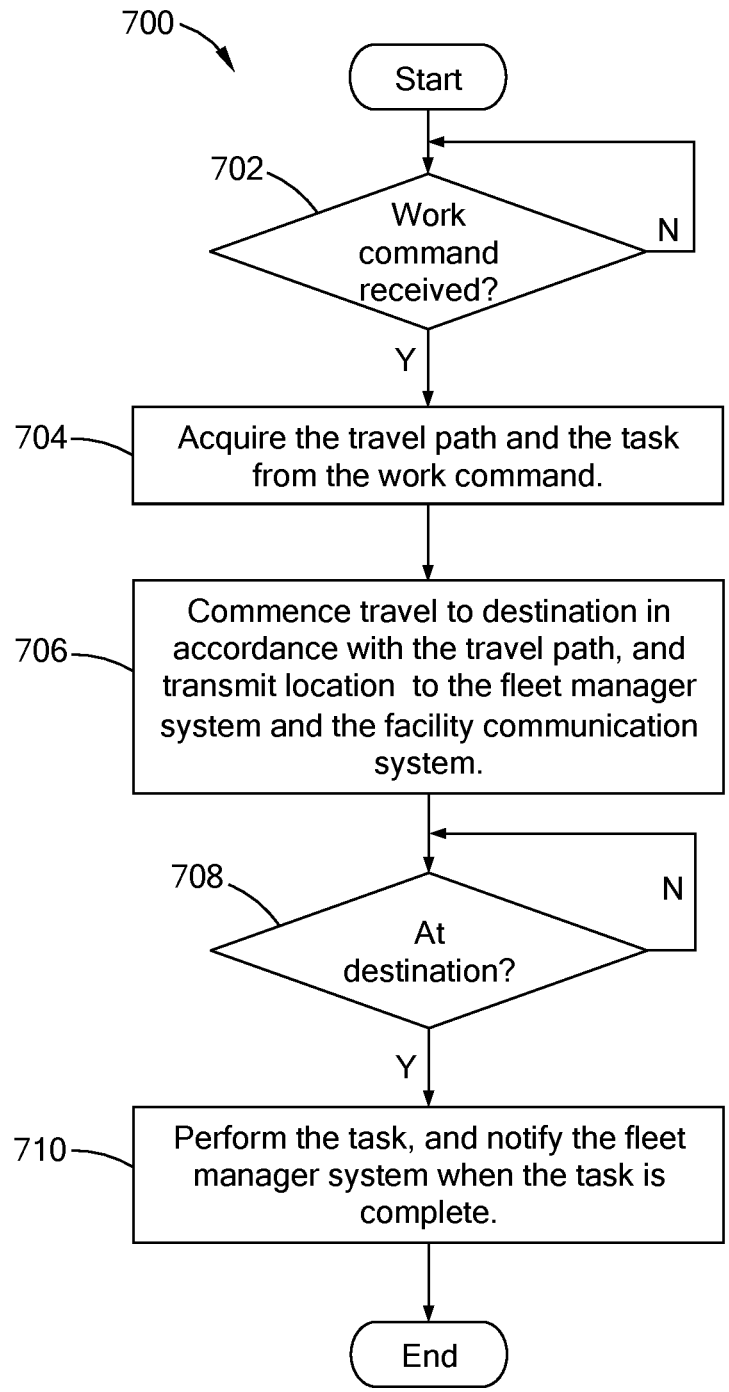
FIG. 7 is a flowchart of a robot control routine in accordance with the teachings of the present disclosure.

Referring to FIG. 7, a flowchart of a robot control routine 700 performed by the robot is presented. At 702, the robot determines if a work command is received. If so, the robot acquires the travel path and the task from the work command, at 704. At 706, the robot commences travel to the destination based on the travel path, and transmits its location to the fleet manager system and the facility communication system until the robot reaches the destination. For example, the robot may track its location using RTLS, LIDAR device with simultaneous localization and mapping (SLAM), and/or other suitable methods. In one form, the robot may only transmit its location to the fleet manager system, and the facility communication system acquires the location from the manager system. At 708, the robot determines if it has reached its destination. If so, the robot performs the task and notifies the fleet manager system when task is complete, at 710.

Figure 8:
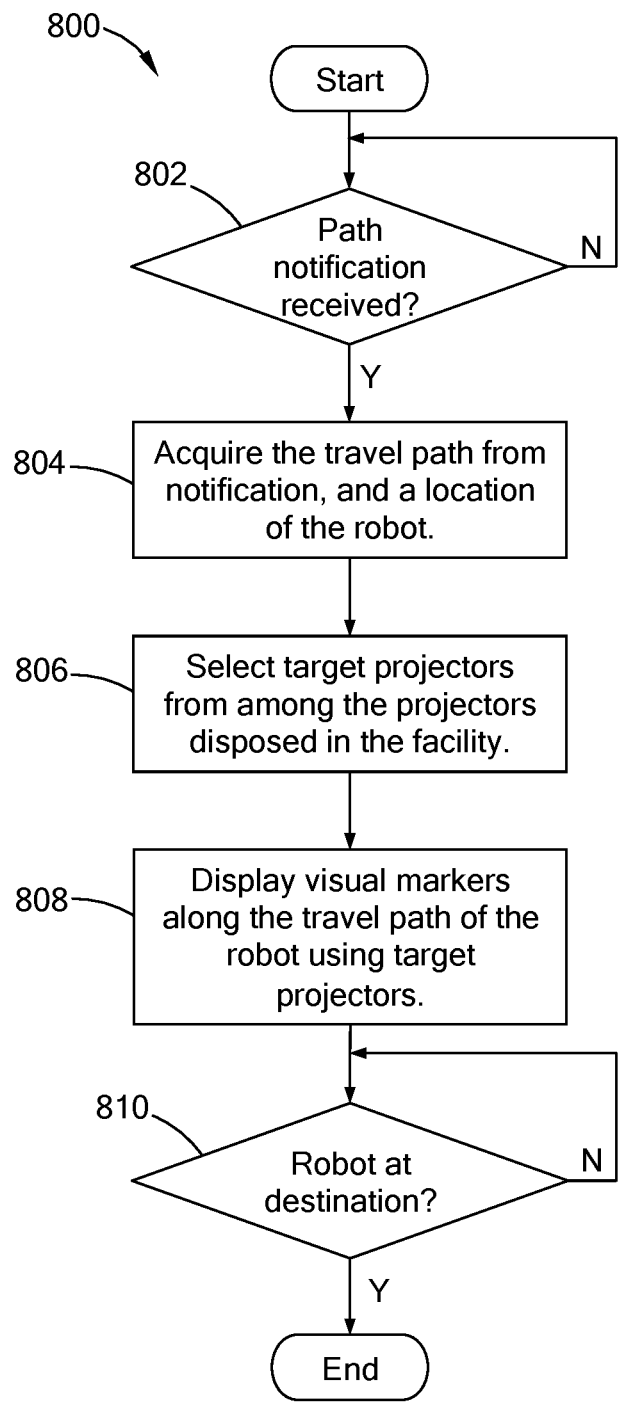
FIG. 8 is a flowchart of a path display routine in accordance with the teachings of the present disclosure.

Referring to FIG. 8, a flowchart of a path display routine 800 performed by the facility notification system is presented. At 802, the notification system determines whether a path notification is received. If so, the notification system acquires the travel path and a location of the robot, at 804. At 806, the notification system selects the target projectors from among the projectors disposed in the as described above. At 808, the notification system displays visual markers along the travel path of the robot as the robot moves using the target projectors. At 810, the notification system determines whether the robot is the destination. If so, the routine ends, and the remaining visual markers are no longer displayed.

The routines 600, 700, and 800 are one method of providing a robot path request, controlling a robot based on a work command, and displaying visual markers along the path. Other may be used while remaining within the scope of the present disclosure. In addition, other routines may be defined in accordance with the teaching of the present disclosure for performing other operations of the fleet manager system, the robot, the facility notification system. For example, different routines may be used for generating the area notification request and displaying the area restriction. In another example.

The system of the present disclosure includes a fleet manager system and a facility notification system that improves the communication between, for example, robots and humans. For example, the fleet manager system tracks the movement and operation of robots and manual operated vehicles through the facility, and also records restricted areas. This information can then be communicated to robots and humans by way of the facility notification system. For example, using travel paths defined for robots/manual operated vehicles, the notification system displays visual markers along the travel to notify humans of the robot's or even the driver's intent. In addition, the notification system can display alerts/messages regarding restricted areas.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
    receiving a robot travel path for a robot in a facility;
    selecting one or more target projectors disposed along the robot travel path, wherein the one or more target projectors are selected from among a plurality of projectors disposed in the facility;
    displaying, by the one or more target projectors, one or more visual markers along the robot travel path of the robot to communicate an intended movement of the robot;
    receiving a vehicle travel path for a manual operated vehicle in the facility;
    selecting one or more auxiliary target projectors disposed along the vehicle travel path of the manual operated vehicle, wherein the auxiliary target projectors are selected from among the plurality of projectors disposed in the facility and are different from the target projectors displaying the visual markers for the robot; and
    displaying, by the auxiliary target projectors, one or more auxiliary visual markers for the vehicle travel path of the manual operated vehicle.

2. The method of claim 1, wherein the visual markers are displayed within a defined distance from the robot as the robot moves along the robot travel path, wherein the defined distance includes a set distance or a variable distance that is based on speed, set time of travel, the robot travel path, or a combination thereof.

3. The method of claim 1 further comprising:
    acquiring data from an object detector disposed in the facility; and
    determining whether a human is present in proximity of the robot based on the data, wherein the one or more visual markers are displayed along the robot travel path in response to the human being present, and no visual markers are displayed in response to no human being present.

4. The method of claim 1 further comprising:
    acquiring data from an object detector disposed in the facility;
    determining whether an object is present along the robot travel path of the robot based on the data from the object detector; and
    notifying the robot of the object in response to the object being present along the robot travel path.

5. The method of claim 4 further comprising receiving a revised robot travel path to avoid the object, wherein the one or more target projectors are selected based on the revised robot travel path.

6. The method of claim 1 further comprising:
    detecting, by the robot, a human in proximity of robot; and
    issuing, by the robot, an alert in response to detecting the human.

7. The method of claim 1 further comprising:
    receiving, by the robot, a work command from a fleet manager, wherein the work command includes a destination for the robot;

defining, by the robot, the robot travel path to the destination based on a current location of the robot; and transmitting, by the robot, the robot travel path to a facility notification system that selects the target projectors and displays the visual markers via the target projectors.

8. The method of claim 1, wherein the robot travel path is provided by a fleet manager system and the target projectors are selected and controlled by a facility notification system.

9. The method of claim 8 further comprising:

receiving, from the fleet manager system, an area notification request to have a visual notification projected on a selected area of the facility, wherein the area notification request includes information identifying the selected area within the facility and the type of notification to be projected;

selecting, by the facility notification system, a second target projector provided in the selected area, wherein the second target projector is selected from among the plurality of projectors and is not displaying the visual marker for the robot; and displaying, by the second target projector, the visual notification in the selected area.

10. A method comprising:

receiving, by a facility notification system from a fleet manager system, a path notification request for a robot in a facility, wherein the path notification request includes information indicative of a travel path of the robot;

selecting, by the facility notification system, one or more target projectors provided along the travel path, wherein the one or more target projectors are selected from among a plurality of projectors attached at one or more locations of the facility;

acquiring, by the facility notification system, data from an object detector disposed in the facility;

determining, by at least one of the facility notification system and the fleet manager system, whether a human is present in proximity of the robot based on the data from the object detector; and displaying, by the one or more target projectors, one or more visual markers along the travel path of the robot to communicate an intended movement of the robot in response to the human being present.

11. The method of claim 10 further comprising:

notifying, by the fleet manager system, the robot of the human in response to the human being present; and issuing, by the robot, an alert to notify the human of the robot.

12. The method of claim 10, wherein the object detector includes a camera, a thermal imaging sensor, a laser, a light detection and ranging (LIDAR) device, and/or a combination thereof.

13. The method of claim 10 further comprising:

determining, by the fleet manager system, the travel path of the robot based on a current location of the robot and a destination of the robot; and transmitting, by the fleet manager system, the travel path and a work command to the robot and the path notification request to the facility notification system.

14. The method of claim 10 further comprising continuously acquiring a location of the robot to continuously display the visual markers until the robot completes travel along the travel path.

15. The method of claim 10, wherein the visual markers are displayed within a defined distance from the robot as the robot moves along the travel path, wherein the defined distance includes a set distance or a variable distance that is based on speed, set time of travel, the travel path, or a combination thereof.

16. The method of claim 10 further comprising:

detecting, by the robot, a human in proximity of robot; and issuing, by the robot, an alert in response to detecting the human, wherein the alert is a visual notification, an audible notification, or a combination thereof to notify the human of the robot.

17. The method of claim 10 further comprising:

receiving, from the fleet manager system, an area notification request to have a visual notification projected on a selected area of the facility, wherein the area notification request includes information identifying the selected area within the facility and the type of notification to be projected;

selecting, by the facility notification system, a second target projector provided in the selected area, wherein the second target projector is selected from among the plurality of projectors and is not displaying the visual marker for the robot; and displaying, by the second target projector, the visual notification in the selected area.

18. The method of claim 10 further comprising:

receiving, from the fleet management system, a travel path for a manual operated vehicle in the facility;

selecting, by the facility notification system, one or more auxiliary target projectors disposed along the travel path of the manual operated vehicle, wherein the auxiliary target projectors are selected from among the plurality of projectors disposed in the facility and is not displaying the visual markers for the robot; and displaying, by the auxiliary target projectors, one or more auxiliary visual markers for the travel path of the manual operated vehicle.

* * * * *